United States Patent [19]

Shima et al.

[11] 4,205,019

[45] May 27, 1980

[54] PROCESS FOR PRODUCING THERMOPLASTIC RESIN

[75] Inventors: Takesaburo Shima, Saijo; Hiroshi Kozima; Tomio Yoshida, both of Niihama; Joji Nakamura, Nishinomiya, all of Japan

[73] Assignee: Sumitamo Naugatuck Co., Ltd., Japan

[21] Appl. No.: 860,029

[22] Filed: Dec. 12, 1977

Related U.S. Application Data

[63] Continuation of Ser. No. 750,766, Dec. 15, 1976, Pat. No. 4,112,021.

[30] Foreign Application Priority Data

Dec. 26, 1975 [JP] Japan .................................. 50-156731

[51] Int. Cl.$^2$ ............................................ C08F 279/04
[52] U.S. Cl. ...................................... 525/243; 525/193
[58] Field of Search ........................ 260/876 R, 880 R

[56] References Cited

U.S. PATENT DOCUMENTS

| | | | |
|---|---|---|---|
| 3,509,237 | 4/1970 | Aubrey | 260/880 R |
| 3,624,183 | 11/1971 | Leach | 260/880 R |
| 3,957,912 | 5/1976 | Cincera | 260/880 R |
| 4,009,227 | 2/1977 | Ott | 260/880 R |
| 4,042,647 | 8/1977 | Cornell | 260/880 R |
| 4,046,839 | 9/1977 | Papetti | 260/880 R |

*Primary Examiner*—Paul R. Michl
*Attorney, Agent, or Firm*—Jones, Tullar & Cooper

[57] ABSTRACT

A process for producing a thermoplastic resin having excellent impact resistance and processability, which comprises: polymerizing an aromatic monovinyl monomer and a vinyl cyanide monomer in the presence of an aqueous elastomeric latex, mixing with agitation the resulting copolymer latex with an aromatic monovinyl monomer and a vinyl cyanide monomer in the presence of a polyalkylene oxide and a coagulant to give a stable suspension phase, and polymerizing the mixture, and said thermoplastic resin thus produced, and a composition comprising said thermoplastic resin and a copolymer produced from an aromatic monovinyl monomer and a vinyl cyanide monomer.

2 Claims, No Drawings

PROCESS FOR PRODUCING THERMOPLASTIC RESIN

This is a continuation of application Ser. No. 750,766, filed Dec. 15, 1976, now U.S. Pat. No. 4,112,021 issued Sept. 5, 1978.

The present invention relates to a process for producing a thermoplastic resin having excellent impact resistance and processability. More particularly, it relates to a process for producing a thermoplastic resin by polymerizing an aromatic monovinyl monomer and a vinyl cyanide monomer in the presence of an aqueous elastomeric latex, mixing with agitation the resulting copolymer latex with an aromatic monovinyl monomer and a vinyl cyanide monomer in the presence of a polyalkylene oxide and a coagulant and polymerizing the mixture, and the thermoplastic resin thus produced, and a composition comprises said thermoplastic resin and a copolymer produced from an aromatic monovinyl monomer and a vinyl cyanide monomer.

There have, hitherto, been proposed various processes for producing thermoplastic resins having an impact resistance by the suspension polymerization of a mixture of an elastomeric latex and polymerizable monomers.

For instance, (A) the polmerization is carried out by admixing both a water-soluble polymerization initiator and an oil-soluble polymerization initiator to a mixture of an elastomeric latex and monomers, wherein a suspending agent (e.g. polyvinyl alcohol) is previously present in the polymerization system, and thereby the polymerization system is changed from the state of emulsion to suspension during the polymerization reaction and then the polymerization reaction is completed (cf Japanese Patent Publication No. 21073/1968).

However, this process has some defects that when the phase transition from the emulsion to the suspension of the polymerization system is accompanied with undesirable increase of the viscosity, blocking and coagulation of the system and further the fouling of the polymer onto the polymerization vessel. Moreover, this process is hardly applied to the production of the polymer having excellent properties like ABS resin (acrylonitrile-butadiene-styrene resin) which is the representative polymer produced by the present invention. Besides, when the desired polymer is produced by this known process, the reaction conditions must be severely controlled, for which a highly skilled person is required.

(B) For preventing the fouling of the polymer onto the polymerization vessel as in the above process, there has been proposed an improved process wherein an aqueous solution of an electrolyte is added to the polymerization system while the phase transition from the emulsion to the suspension occurs (cf Japanese Patent Publication No. 84893/1973).

(C) There has also been proposed a process for the suspension polymerization of a mixture of an elastomeric latex or a graft latex thereof and monomers by using a suspending agent (e.g. polyvinyl alcohol), wherein a coagulant (e.g. an acid or an electrolyte) is added to the mixture of the latex and monomers with vigorous agitation (cf Japanese Patent Publication No. 25191/1974).

However, the above (B) and (C) processes require the vigorous agitation when the phase transition from the emulsion to the suspension occurs, and as the result, many bubbles are unfavorably produced in the polymerization system to give floating beads. Besides, when the polymer in the form of beads is accidently scattered on the floor, it is very dangerous for walking around them and incidentally endangers people's lives within a laboratory or a factory.

As the results of the extensive studies, the present inventors have now found an improved process for produding the desired thermoplastic resins without such defects as in the conventional processes.

An object of the present invention is to provide an improved process for producing a thermoplastic resin having excellent impact resistance and processability.

Another object of the invention is to provide a process for producing the desired thermoplastic resin simply and safely.

A further object of the invention is to provide the thermoplastic resin thus produced.

A still further object of the invention is to provide a thermoplastic resin composition.

These and other objects of the invention will be apparent from the following description.

According to the present invention, the desired thermoplastic resin can be produced by previously polymerizing an aromatic monovinyl monomer and a vinyl cyanide monomer in the presence of an aqueous elastomeric latex, mixing with agitation the resulting copolymer latex with an aromatic monovinyl monomer and a vinyl cyanide monomer in the presence of a polyalkylene oxide and a coagulant to give a stable suspension phase, and graft-polymerizing with agitation the mixture, and the desired thermoplastic resin composition can be produced by mixing the thermoplastic resin obtained above with a copolymer produced from an aromatic monovinyl monomer and a vinyl cyanide monomer.

The thermoplastic resin obtained by the present invention has the following excellent properties.

(1) It has an excellent impact resistance and processability.

(2) It has an excellent tensile strength.

(3) It can rapidly be dried because it is in the form of granule.

(4) It is not dangerous even if it is scattered on the floor because of the granular form, contrary to the conventional thermoplastic resins which are in the form of beads.

(5) It can be molded by an injection molding without through the compounding step.

(6) Stabilizers, lubricants, pigments or the like can easily and tightly be adhered onto the granules of the resin with a Henschel mixer, etc. Accordingly, there is no problem, such as separation or peeling of additives, during the transportation thereof by an air pressure or a screw.

(7) The composition of the present thermoplastic resin with another copolymer has far higher impact strength in comparison with the composition of the conventional thermoplastic resin with another copolymer.

(8) The advantages in the process of the present invention are as follows:

(i) the agitation can be done with a lower power, (ii) the floating beads are very few, (iii) the amount of the polyalkylene oxide is so small, and therefore, the waste liquid has a far lower concentration and can be more easily treated, in comparison with the waste liquid produced in the conventional polymerization reaction using a suspending agent, and (iv) the polymerization system has a lower viscosity, and therefore, the polymerization conditions, such as polymerization temperature, can very easily be controlled.

The elastomeric latex used in the present invention includes a butadiene latex (e.g. polybutadiene latex, butadiene-styrene copolymer latex, butadiene-acrylonitrile copolymer latex), an elastomeric latex of chloroprene and acrylic esters, or the like. These elastomeric latices may be used alone or in a combination of two or more thereof.

The monomers to be polymerized in the presence of the elastomeric latex include aromatic monovinyl monomers (e.g. styrene, α-methylstyrene, vinyltoluene, monochlorostyrene, etc.) and vinyl cyanide monomers (e.g. acrylonitrile, methacrylonitrile, etc.). These monomers may be used alone or in a combination thereof.

The ratio of the monomers to be polymerized in the presence of the elastomeric latex is not critical, but it is usually preferable to use in the ratio of 10 to 200 parts by weight, more preferably 20 to 100 parts by weight, of the monomers per 100 parts by weight of the elastomer contained in the elastomeric latex (i.e. the solid components in the latex) from the economical viewpoint. Besides, the ratio of each monomer is not critical, either, but it is usually used in the ratio of 20 to 40% by weight of the vinyl cyanide monomer per 80 to 60% by weight of the aromatic monovinyl monomer, from the viewpoint of the desirably balanced properties of the final composition.

The polymerization of the aromatic monovinyl monomer and the vinyl cyanide monomer in the presence of the elastomeric latex can be carried out under the same conditions as in the conventional emulsion polymerization reaction.

Furthermore, the ratio of the monomers to be subsequently polymerized with the copolymer latex is not critical, either, but it is usually preferable to use in the ratio of 30 to 2000 parts by weight, more preferably 100 to 1000 parts by weight, of the monomers per 100 parts by weight of the elastomer contained in the copolyer latex. The monomers, i.e. the aromatic monovinyl monomer and the vinyl cyanide monomer, are the same or different from those used in the foregoing polymerization and include the monomers as mentioned above. Thus, the ratio of the monomers to the elastomer in the final thermoplastic resin is not critical, but it is preferable that the content of the elastomer is 5 to 70% by weight and the content of the monomers is 95 to 30% by weight. When the elastomer is contained in an amount of less than 5% by weight, the thermoplastic resin is inferior in the impact strength.

The addition of the monomers to the polymerization system may be carried out in the same manner as in the conventional graft polymerization reaction.

The polyalkylene oxide used in the present invention includes a polymer of an alkylene oxide having 2 to 3 carbon atoms, such as polyethylene oxide or polypropylene oxide. The molecular weight of the polyalkylene oxide ranges from $2 \times 10^4$ to $1 \times 10^7$, preferably from $1 \times 10^6$ to $5 \times 10^6$. When the molecular weight of the polyalkylene oxide is smaller than the above range, it must be used in a larger amount for the polymerization reaction, and on the other hand, when the molecular weight is too large, the aqueous solution thereof is gelled and therefore is hardly handled. The polyalkylene oxide is used in an amount of 0.001 to 0.5 part by weight, preferably 0.01 to 0.3 part by weight, per 100 parts by weight of total weight of the copolymer latex (solid components) and the monomers. When the polyalkylene oxide is used in an amount of less than 0.001 parts by weight, the mixture does not become a stable dispersion phase, and on the other hand, when the amount is over 0.5 part by weight, it induces trouble in the treatment of the waste liquid and further deteriorates the heat stability and mechanical properties of the final resin product.

In the polymerization of the present invention, there may also be used a polymerization initiator, such as a water-soluble polymerization initiator and an oil-soluble polymerization initiator, which may be used alone or in a combination thereof. Suitable examples of the polymerization initiator are lauroyl peroxide, t-butyl peroxypivalate, benzoyl peroxide, or the like, in order to enhance the degree of grafting.

A chain transfer agent, such as t-dodecylmercaptan or n-dodecylmercaptan, and an antioxidant, such as trisnonylphenyl phosphite, may also optionally be used in the polymerization reaction.

The coagulant used in the present invention includes acids and water-soluble inorganic salts, which are usually used for coagulating the conventional emulsion polymerization products. Suitable examples of the acids are an inorganic acid having a dissociation constant of $1 \times 10^{-5}$ or more at 25° C., such as hydrochloric acid, sulfuric acid or nitric acid, and an organic acid having 1 to 10 carbon atoms and having a dissociation constant of $1 \times 10^{-5}$ or more at 25° C., such as formic acid, acetic acid, oxalic acid or n-butyric acid. The water-soluble inorganic salts include a salt of an acid (e.g. sulfuric acid, hydrochloric acid, acetic acid, etc.) with a metal, such as monovalent, divalent or trivalent metal (e.g. sodium, potassium, magnesium, calcium, barium, aluminum, iron, etc.). The number of ionic charge of the metal is not critical, but the amount of the salt varies with the number of ionic charge. Suitable examples of the water-soluble inorganic salt are sodium sulfate and magnesium sulfate. Besides, the suitable kind and amount of the coagulant may be optionally elected from the standpoint of the mechanical stability of the aqueous elastomeric latex used. The amount of the coagulant may very with the kind of the coagulant, but is usually in the range of 0.01 to 20 parts by weight per 100 parts by weight of total weight of the copolymer latex (solid components) and the monomers.

When the polymerization of the present invention is carried out without using the coagulant, i.e. only by using the polyalkylene oxide alone, the polymerization reaction is remarkedly unstable, and therefore, the polyalkylene oxide should be used in a larger amount, such as several to ten several times of the amount in case of using a coagulant, and furthermore, there are not improved the defects as in the conventional process, such as the production of micro-particles or turbidness of the filtrate of the reaction product. When the coagulant and the polyalkylene oxide are used together, such defects are eliminated.

The copolymer to be mixed with the thermoplastic resin obtained by the process of the present invention is a copolymer produced from an aromatic monovinyl monomer and a vinyl cyanide monomer. Suitable examples of these monomers are the same as described hereinbefore. The ratio of the monomers for the copolymer is not critical, but they are preferably used in the ratio of 20 to 40% by weight of the vinyl cyanide monomer per 80 to 60% by weight of the aromatic monovinyl monomer.

The copolymer may be produced by a conventional polymerization processes, such as an emulsion polymerization, suspension polymerization, solution polymerization, or the like. The copolymer may be admixed with the thermoplastic resin in the ratio of 95% by weight or lower, preferably not more than 90% by weight, on the basis of the whole weight of the mixture. When the copolymer is admixed over 95% by weight, the final composition has a lower Izod impact strength.

The present invention is illustrated by the following Examples, but is not limited thereto.

EXAMPLE 1

By a usual emulsion polymerization process, polybutadiene (70 parts by weight, as solid material) is polymerized with styrene (21 parts by weight) and acrylonitirile (9 parts by weight) in a 10 liter glass reactor, wherein the air in the reactor is replaced with nitrogen gas.

After the polymerization, the resulting copolymer latex (1,800 g, the solid materials: 41%) is mixed with deionized water (3,200 g) and the mixture is agitated at 300 r.p.m. To the mixture is added at one time a mixture of styrene (896 g), acrylonitrile (384 g), lauroyl perioxide (3.2 g), t-dodecylmercaptan (10 g) and tris-nonylphenyl phosphite (10 g) and thereto are further added a 1% aqueous solution of polyethylene oxide having an average molecular weight of $2\times10^6$ (100 g) and a 5% aqueous solution of sodium sulfate (1,600 g). The mixture is heated up to 70° C. and polymerized for 5 hours. During the polymerization reaction, the agitation can be done with the power which is usually used in the conventional emulsion polymerization. At the end of the reaction, the polymerization system has a further lower viscosity, and the resulting polymer dispersion can very easily be handled.

After the polymerization reaction, the reaction product is cooled, filtered, washed with water, and then dried at 70° C. for 5 hours.

The granular particles thus obtained have a narrow distribution of particle sizes as shown below and are white, bulky and homogeneous particles.

Distribution of particle sizes:

| Mesh | 20 | 40 | 60 | 80 | 100 | 100 | passed |
|------|----|----|----|----|-----|-----|--------|
| %    | 8  | 65 | 25 | 2  | 0   | 0   |        |

The filtrate obtained above is clear, and there is no adhesion of the polymer onto the reactor wall and the agitating blades.

The granular particles (100 parts by weight) are admixed with calcium stearate (0.3 part by weight) and Sumilizer ®BHT (an antioxidant, made by Sumitomo Chemical Company, Limited, 0.3 part by weight). After mixing well, the mixture is molded by an injection molding to give a test piece. As the result, the granular particles are well bitten into the injection machine with good rate of injection molding.

EXAMPLE 2

The Example 1 is repeated except that a 5% aqueous solution of sodium sulfate (500 g) and a 0.5% aqueous solution of magnesium sulfate (50 g) are used instead of the 5% aqueous solution of sodium sulfate (1,600 g) and the deionized water is used in an amount of 4,270 g instead of 3,220 g.

The granular particles thus obtained have the following distribution of particle sizes:

| Mesh | 20 | 40 | 60 | 80 | 100 | 100 | passed |
|------|----|----|----|----|-----|-----|--------|
| %    | 5  | 70 | 23 | 2  | 0   | 0   |        |

The granular particles can be molded by an injection molding without any trouble as like as in Example 1.

EXAMPLE 3

In the same manner as described in Example 2, the polymerization is carried out except that the 1% aqueous solution of polyethylene oxide is used in an amount of 60 g instead of 100 g, and the deionized water is used in an amount of 4,300 g.

The granular particles thus obtained have the following distribution of particle sizes:

| Mesh | 20 | 40 | 60 | 80 | 100 | 100 | passed |
|------|----|----|----|----|-----|-----|--------|
| %    | 8  | 60 | 27 | 5  | 0   | 0   |        |

The granular particles can be molded by an injection molding without any trouble as like as in Example 1.

REFERENCE EXAMPLE 1

In the same manner as described in Example 1, polybutadiene latex (70 parts by weight), styrene (21 parts by weight) and acrylonitrile (9 parts by weight) are polymerized in a 10 liter glass reactor. The polymer latex thus obtained (1,800 g, the solid materials: 41 %) is mixed with deionized water (3,055 g), and the mixture is agitated at 600 r.p.m. To the mixture are added a 5% aqueous solution of polyvinyl alcohol (made by Nippon Gosei Kagaku Kogyo K.K., 68.3 g) and a 3% aqueous solution of Metolose® (methyl cellulose derivative, made by Shin-Etsu Chemical Co., Ltd., 68.3 g) and thereto are further added styrene (896 g), acrylonitrile (384 g) and t-dodecylmercaptan (7.8 g). To the mixture is added dropwise a 5% aqueous solution of acetic acid (130 g) over a period of 15 minutes and thereto are further added a solution of magnesium sulfate (73.8 g) in water (390 g) and lauroyl perioxide (13.7 g). The mixture is agitated for 30 minutes and heated up to 75° C. and then polymerized for 5 hours. After the polymerization reaction, the reaction mixture is cooled, filtered, washed with water and dried at 70° C. for 35 hours.

The beads-like particles thus obtained have the following distribution of particle sizes and are faint yellow and semi-transparent.

Distribution of particle sizes:

| Mesh | 20 | 40 | 60 | 80 | 100 | 100 | passed |
|------|----|----|----|----|-----|-----|--------|
| %    | 40 | 20 | 15 | 10 | 10  | 5   |        |

The filtrate obtained above is white and unclear, and there are a large amount of adhesion of the polymer onto the reactor wall and the agitating blades.

At the initiation of and during the polymerization reaction, the agitation should be done with a large power, and about two times or more of agitation rate than that in the present invention is required in order to effect the homogeneous mixing.

When the particles are dried for the same time as in the present invention, the molded product obtained therefrom shows undesirable silver streaks and can be practically used.

The beads-like particles (100 parts by weight) are admixed with calcium stearate (0.3 part by weight) and Sumilizer® BHT (0.3 part by weight). After mixing well, the mixture is directly molded by an injection molding. As the result, the beads-like particles are badly bitten into the injection machine and therefore it is necessary to slow the rate of the injection molding.

REFERENCE EXAMPLE 2

In the same manner as described in Example 1, polybutadiene latex (70 parts by weight), styrene (21 parts by weight) and acrylonitrile (9 parts by weight) are polymerized in a 10 liter glass reactor. The graft polymer thus obtained (1,800 g, the solid materials: 41 %) is mixed with deionized water (4,144 g), and the mixture is agitated at 300 r.p.m. To the mixture is added at one time a mixture of styrene (896 g), acrylonitrile (384 g), lauroyl peroxide (3.2 g), t-dodecylmercaptan (10 g) and tris-nonylphenyl phosphite (10 g).

To the mixture is added a 2% aqueous solution of polyethylene oxide having an average molecular weight of $2 \times 10^6$ (100 g), but there can not be obtained a stable aqueous dispersion and the aqueous solution as mentioned above (200 g) should be additionally added thereto. The mixture is heated up to 75° C. and polymerized for 5 hours. After the polymerization reaction, the reaction product is cooled, filtered, washed with water and dried at 70° C. for 13 hours. The filtrate thus obtained is white and unclear. At the initiation of and during the polymerization reaction, the agitation power is higher than that in Examples 1 to 3 of the present invention, but it is not necessary to increase the rate of the agitation as in Reference Example 1. The time for drying of the particles obtained in this Reference Example 2 is shorter than that in Reference Example 1, but is far longer than that in Example 1 to 3. The particles of Reference Example 2 has the following distribution of particle sizes:

| Mesh | 20 | 40 | 60 | 80 | 100 | 100 passed |
|------|----|----|----|----|----|----|
| % | 20 | 37 | 29 | 10 | 5 | 0 |

The particles (100 parts by weight) are admixed with calcium stearate (0.3 part by weight) and Sumilizer® BHT (0.3 part by weight). After mixing well, the mixture is directly molded by an injection molding. As the result, the particles are badly bited into the injection machine as like as in Reference Example 1.

Various properties of the products in Example 1 to 3 and in Reference Example 1 and 2 were measured on the molded test pieces. The results are shown in the following Table 1.

Table 1

|  | Example | | | Reference Example | |
|---|---|---|---|---|---|
|  | 1 | 2 | 3 | 1 | 2 |
| Izod impact strength (kg cm/cm$^2$)[1] ($\frac{1}{4}$", with notch, at 23° C.) | 37.0 | 38.5 | 38.0 | 21.0 | 25.0 |
| Tensile strength (kg/cm$^2$)[2] | 356 | 360 | 355 | 240 | 270 |
| Heat distortion temperature (°C.)[3] (In annealing at 264 psi, at 85° C., for 2 hours) | 92.4 | 93.0 | 92.0 | 88.6 | 90.2 |
| Hardness (R - scale)[4] | 105 | 105 | 105 | 89 | 99 |
| Flow rate (cc/minute)[5] (at 210° C., 30 kg/cm$^2$) | 0.108 | 0.102 | 0.105 | 0.038 | 0.076 |

[Remarks]:
[1] It was measured in accordance with the provision of ASTM D-256.
[2] It was measured in accordance with the provision of ASTM D-638.
[3] It was measured in accordance with the provision of ASTM D-648.
[4] It was measured in accordance with the provision of ASTM D-785-66.
[5] It was measured by using Koka flow tester.

EXAMPLE 4

The polymer obtained in Example 1 is mixed with styrene-acrylonitrile copolymer ($\eta_{DMF}=0.62$) obtained by a suspension polymerization together with an additive in the ratio as mentioned in the following Table 2. The mixture is directly molded by an injection molding to give test pieces.

REFERENCE EXAMPLE 3

The polymer obtained in Reference Example 1 is mixed with styrene-acrylonitrile copolymer used in Example 4 together with an additive in the ratio as mentioned in the following Table 2. The mixture is directly molded by an injection molding to give test pieces.

Various properties of the test samples in Example 4 and Reference Example 3 were measured. The results are shown in Table 2.

Table 2

|  | Example 4 | | | Reference Example 3 | | |
|---|---|---|---|---|---|---|
|  | A | B | C | A | B | C |
| Polymer in Example 1 | 90 | 50 | 20 | — | — | — |
| Polymer in Reference Example 1 | — | — | — | 90 | 50 | 20 |
| Styrene-acrylonitrile copolymer | 10 | 50 | 80 | 10 | 50 | 80 |
| Izod impact strength (kg cm/cm$^2$) ($\frac{1}{4}$", with notch, at 23° C.) | 33.0 | 19.3 | 7.8 | 19.4 | 10.2 | 4.6 |
| Heat distortion temperature (°C.) ($\frac{1}{4}$", 264 psi) | 93.2 | 94.1 | 94.8 | 90.6 | 91.8 | 92.5 |
| Flow rate (cc/minute) | 0.120 | 0.18 | 0.22 | 0.06 | 0.14 | 0.19 |

[Remark]: These properties were measured in the same manner as in Table 1.

EXAMPLE 5

The polymer obtained in Example 2 is mixed with styrene-acrylonitrile copolymer ($\eta_{DMF}=0.65$) produced by an emulsion polymerization together with an additive in the ratio as mentioned in the following Table 3. The mixture is directly molded by an injection molding to give test pieces.

REFERENCE EXAMPLE 4

The polymer obtained in Reference Example 2 is mixed with styrene-acrylonitrile copolymer as used in Example 5 together with an additive in the ratio as mentioned in the following Table 3. The mixture is directly molded by an injection molding to give test pieces.

Various properties of the molded products in Example 5 and Reference Example 4 were measured. The results are shown in Table 3.

Table 3

|  | Example 5 | | | Reference Example 4 | | |
| --- | --- | --- | --- | --- | --- | --- |
|  | A | B | C | A | B | C |
| Polymer in Example 2 | 80 | 40 | 10 | — | — | — |
| Polymer in Reference Example 2 | — | — | — | 80 | 40 | 10 |
| Styrene-acrylonitrile copolymer | 20 | 60 | 90 | 20 | 60 | 90 |
| Izod impact strength (kg cm/cm$^2$) ($\frac{1}{4}''$, with notch, at 23° C.) | 33.0 | 15.7 | 4.1 | 21.3 | 9.8 | 2.5 |
| Heat distortion temperature (°C.) ($\frac{1}{4}''$, 264 psi) | 93.0 | 94.3 | 95.0 | 90.8 | 92.1 | 93.2 |
| Flow rate (cc/minute) | 0.14 | 0.20 | 0.24 | 0.10 | 0.17 | 0.22 |

[Remark]: These properties were measured in the same manner as in Table 1.

What is claimed is:

1. A thermoplastic resin, which is produced by emulsion polymerizing monomers consisting of 80 to 60% by weight of an aromatic monovinyl monomer and 20 to 40% by weight of a vinyl cyanide monomer in the presence of an aqueous elastomeric latex, said monomers being used in the ratio of 20 to 100 parts by weight per 100 parts by weight of the elastomer contained in the aqueous elastomeric latex; mixing with agitation the resulting copolymer latex with monomers consisting of 80 to 60% by weight of an aromatic monomvinyl monomer and 20 to 40% by weight of a vinyl cyanide monomer in the presence of a polyalkylene oxide selected from the group consisting of polyethylene oxide and polypropylene oxide and a coagulant selected from the group consisting of an inorganic acid having a dissociation constant of $1\times10^{-5}$ or more at 25° C., an organic acid having 1 to 10 carbon atoms and having a dissociation constant of $1\times10^{-5}$ or more at 25° C. and a water-soluble salt of the inorganic or organic acid with a monovalent, divalent or trivalent metal, said monomers being used in the ratio of 100 to 1000 parts by weight per 100 parts by weight of the elastomer contained in the resulting copolymer latex; and suspension polymerizing the mixture.

2. A composition comprising (a) the thermoplastic resin as set forth in claim 1 and (b) a copolymer produced from 20 to 40% by weight of a vinyl cyanide monomer and 80 to 60% by weight of an aromatic monovinyl monomer, said copolymer being present in an amount of not more than 95% by weight on the basis of the combined weight of (a) and (b).

* * * * *